(12) United States Patent
Hiratsuna et al.

(10) Patent No.: US 6,578,270 B2
(45) Date of Patent: Jun. 17, 2003

(54) BUSH CUTTING MACHINE

(75) Inventors: Kenjiro Hiratsuna, Wako (JP); Akito Kono, Wako (JP); Takao Kobayashi, Wako (JP); Atsushi Kojima, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 26 days.

(21) Appl. No.: 10/015,406

(22) Filed: Dec. 12, 2001

(65) Prior Publication Data

US 2002/0078671 A1 Jun. 27, 2002

(30) Foreign Application Priority Data

Dec. 15, 2000 (JP) ........................................ 2000-381407

(51) Int. Cl.$^7$ .............................. B26B 7/00; A01D 34/90
(52) U.S. Cl. .............................. 30/276; 30/347; 56/15.7
(58) Field of Search ...................... 30/276, 347; 188/74, 188/75, 78, 79, 184, 325; 192/104 B, 104 C, 105 CD, 201; 56/15.7

(56) References Cited

U.S. PATENT DOCUMENTS

| | | | | | |
|---|---|---|---|---|---|
| 5,577,587 | A | * | 11/1996 | Jansson | 192/105 CD |
| 5,774,993 | A | * | 7/1998 | Schlessmann | 30/276 |
| 6,065,214 | A | * | 5/2000 | Nagashima | 30/276 |
| 6,176,016 | B1 | * | 1/2001 | Higashi et al. | 30/276 |
| 2002/0095797 | A1 | * | 7/2002 | Warashina et al. | 30/276 |

FOREIGN PATENT DOCUMENTS

| | | |
|---|---|---|
| JP | 51053248 | 9/1975 |
| JP | 51099039 | 5/1976 |

* cited by examiner

Primary Examiner—Hwei-Siu Payer
(74) Attorney, Agent, or Firm—Adams & Wilks

(57) ABSTRACT

A bush cutting machine including an automatic braking mechanism having a brake drum formed integrally with a clutch case which houses a centrifugal clutch. When the number of rotations of a clutch drum decreases, at least two braking members press against the brake drum, whereby the clutch drum stops rotating, and a cutting blade also stops rotating automatically.

2 Claims, 4 Drawing Sheets

BUSH CUTTING MACHINE

FIELD OF THE INVENTION

The present invention relates to an improvement in a brake for stopping rotation of cutting blades of bush cutting machines.

BACKGROUND OF THE INVENTION

A brake for a bush cutting machine is disclosed, for example, in Japanese Utility Model Laid-Open Publication No. SHO-51-53248 entitled "Rotary Cutter Stopping Device for Bush Cutting Machine", or in Japanese Utility Model Laid-Open Publication No. SHO-51-99039 entitled "Safety Device for Bush Cutting Machine".

The rotary cutter stopping device of SHO-51-53248 has a pair of brake shoes provided on an outer periphery of a driven shaft, cam plates mounted to press the respective brake shoes. When grip of a brake lever is released, the cam plates are rotated by springs, pressing the brake shoes against the outer periphery of the driven shaft, thereby stopping the rotary cutter. The above rotary cutter stopping device, however, requires an operator's constant operation of the brake lever, which is troublesome, when stopping the rotary cutter. Further, the device requires such components as a brake lever and wires, increasing the number of components and thereby increasing the production cost.

The safety device of SHO-51-99039 has brake linings provided proximately to an outer periphery of a clutch drum. When grip of a brake lever is released, the brake linings come into contact with the clutch drum, and a motor is stopped in response to a signal from a movable contact, thereby stopping the rotary cutter. This safety device, however, requires an operator's constant operation of the lever, which is troublesome, when stopping the motor and the rotary cutter, deteriorating its operability. Further, the device has a rod connected to a linkage, extended through a clutch housing, a construction which requires the consideration of dust- and water-proofing of the through hole. Further, the device requires such efforts as checking and adjustment of the tensioning of the linkage connected to the lever, which efforts are troublesome.

SUMMARY OF THE INVENTION

It is therefore an object of the present invention to provide a bush cutting machine with improved drive operability and improved dustproof and waterproof properties, which can be produced at a relatively low cost.

According to an aspect of the present invention, there is provided a bush cutting machine which comprises: a motor; a centrifugal clutch designed to establish drive connection when a number of rotations of an output shaft of the motor exceeds a predetermined value; a blade driving shaft for transmitting a torque; a cutting blade mounted to a distal end of the blade driving shaft; the centrifugal clutch comprising a clutch drum provided on the blade driving shaft, a centrifugally pivotal member provided on the output shaft of the motor and housed in the clutch drum, and a clutch case connected to a motor housing for enclosing the pivotal member and the clutch drum; and an automatic braking mechanism housed in the clutch case and comprising a brake drum formed integrally within the clutch case, at least two centrifugal braking members pivotally mounted to the clutch drum in such a manner as to expand by a centrifugal force proportionate to the number of rotations of the clutch drum, and resilient members for biasing the braking members to the brake drum, whereby the braking members are brought into abutting engagement with the brake drum with decrease in the number of rotations of the clutch drum.

With the automatic braking mechanism thus installed in the clutch case, it becomes possible to make the braking members abut against the braking drum in accordance with the reduced number of rotations of the clutch drum. When the number of rotations decreases, the braking members press against the braking drum, whereby the clutch drum instantaneously stops rotating and the blade driving shaft and the cutting blade also stop. Thus, the operator does not need to manually control a brake lever to stop the blade driving shaft, leading to improved operability. Further, with the automatic braking mechanism installed in the clutch case, it is no longer necessary to provide in the clutch case a through hole for a wire or a rod for braking. This further leads to the advantage that dustproof and waterproof properties are improved. Furthermore, with the automatic braking mechanism installed in the clutch case, the need for mounting such components as a brake lever or a wire is eliminated, resulting in reduced production cost.

Desirably, the braking members are disposed around the brake drum in equidistantly spaced relation to each other, and the resilient members are provided to extend between adjacent two of the braking members. As a result, the weight of the braking members and the weight of the resilient members can be evenly distributed, thereby preventing unbalanced rotation. The braking members are synchronized to improve the braking properties.

BRIEF DESCRIPTION OF THE DRAWINGS

A preferred embodiment of the present inventing will be described in detail below, by way of example only, with reference to the accompanying drawings, in which.

DETAILED DESCRIPTION OF THE PREFERRED EMBODIMENT

Figure 1:
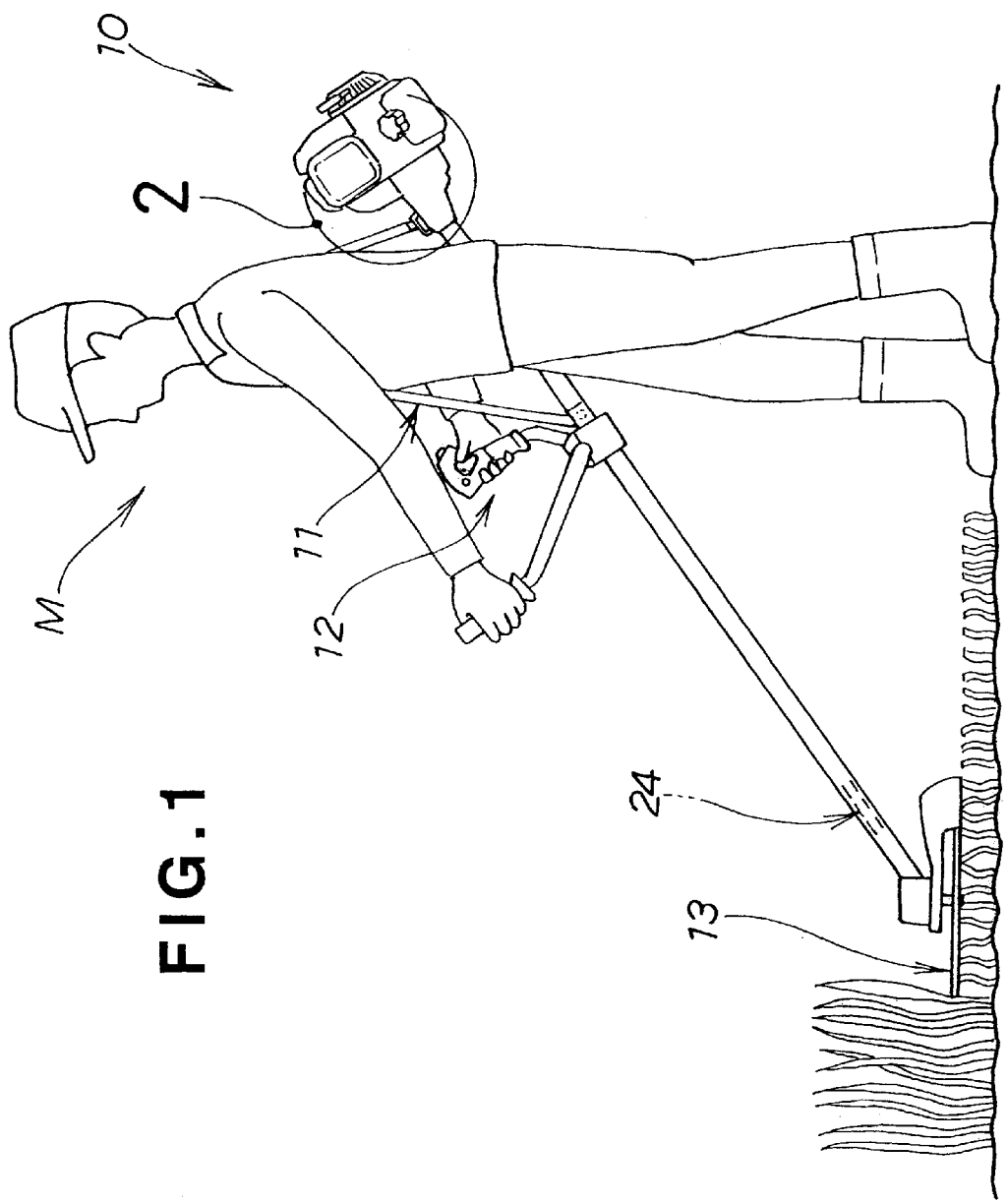
FIG. 1 is a side view showing use of a bush cutting machine according to the present invention.

Referring initially to FIG. 1, when cutting bush, a bush cutting machine 10 according to the present invention is hung from a shoulder of an operator M via a hanging belt or shoulder strap 11 with a controller 12 gripped. Reference numeral 13 denotes a cutting blade for cutting bush.

Figure 2:
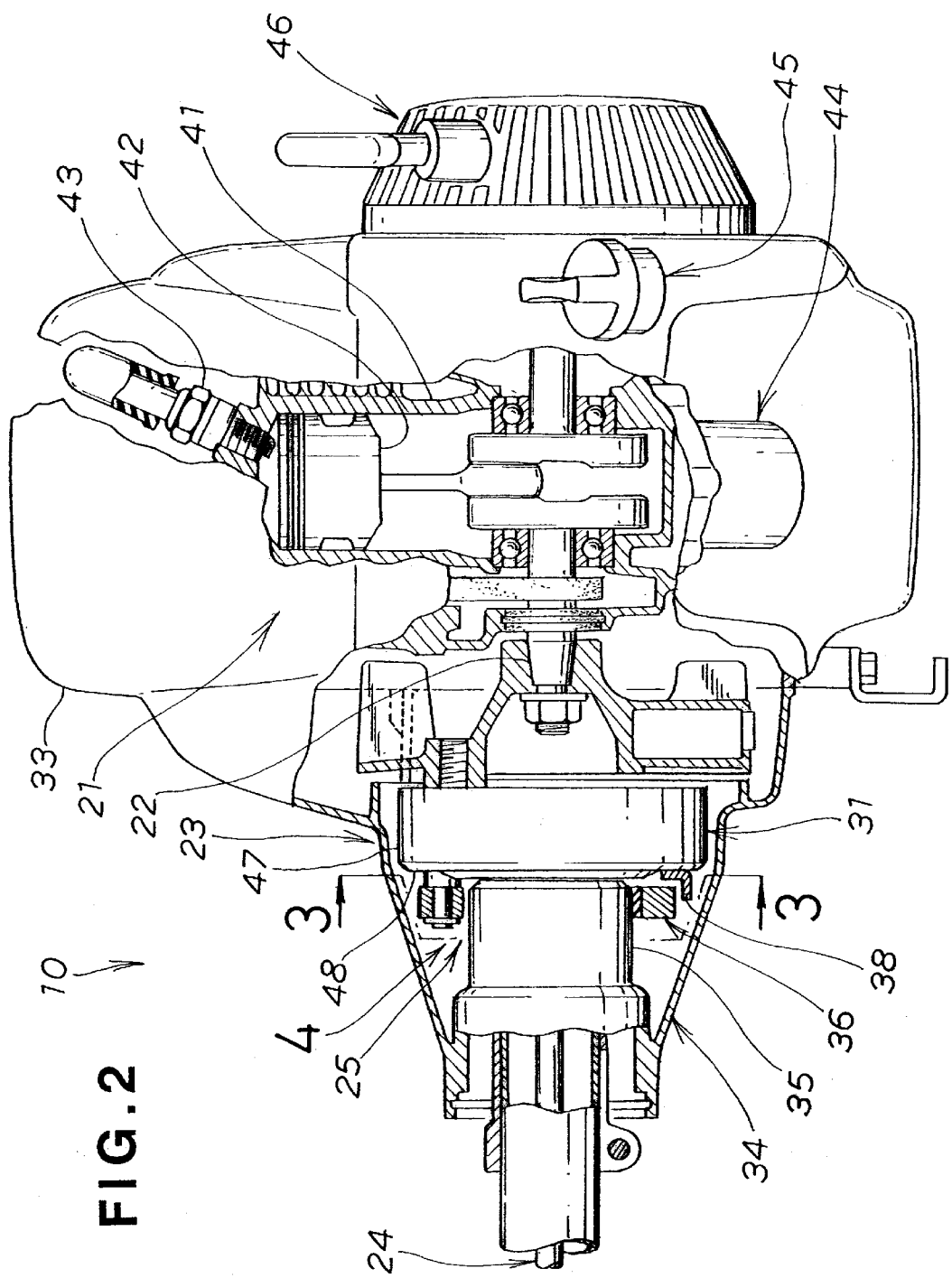
FIG. 2 is a detailed view of portion 2 of FIG. 1.

As shown in FIG. 2, the bush cutting machine 10 has a motor 21, a centrifugal clutch 23 designed to establish drive connection when the number of rotations of a crankshaft 22, serving as an output shaft of the motor 21, exceeds a predetermined value, a blade driving shaft 24 for transmitting a rotational force or torque to the cutting blade 13 shown in FIG. 1, and an automatic braking mechanism 25.

The centrifugal clutch 23 has a clutch drum 31 provided on the blade driving shaft 24, a centrifugally pivotal member 32 (See FIG. 4) provided on the crankshaft 22 of the motor 21 and housed in the clutch drum 31, and a clutch case 34 connected to a motor housing 33, enclosing the pivotal member 32 and the clutch drum 31.

The automatic braking mechanism 25 has a brake drum 35 formed integrally within the clutch case 34, centrifugal braking members 36 pivotally mounted to the clutch drum 31 such that they expand by a centrifugal force proportionate to the number of rotations of the clutch drum 31, and resilient members 37 (See FIG. 3) biasing the braking members 36 to the brake drum 35. The braking mechanism 25 is installed in the clutch case 34. Reference numeral 38 denotes a stopper.

The motor 21 has a cylinder 41, a piston 42, a crankshaft 22, and an ignition plug 43. Reference numeral 44 denotes a fuel tank, 45 an oil tank, and 46 a starter.

The clutch drum 31 has a tubular transmitting portion 47, a disc-shaped connecting portion 48 formed integrally with one end of the transmitting portion 47, and a connecting shaft 49 (See FIG. 4) mounted to the connecting portion 48.

Figure 3:
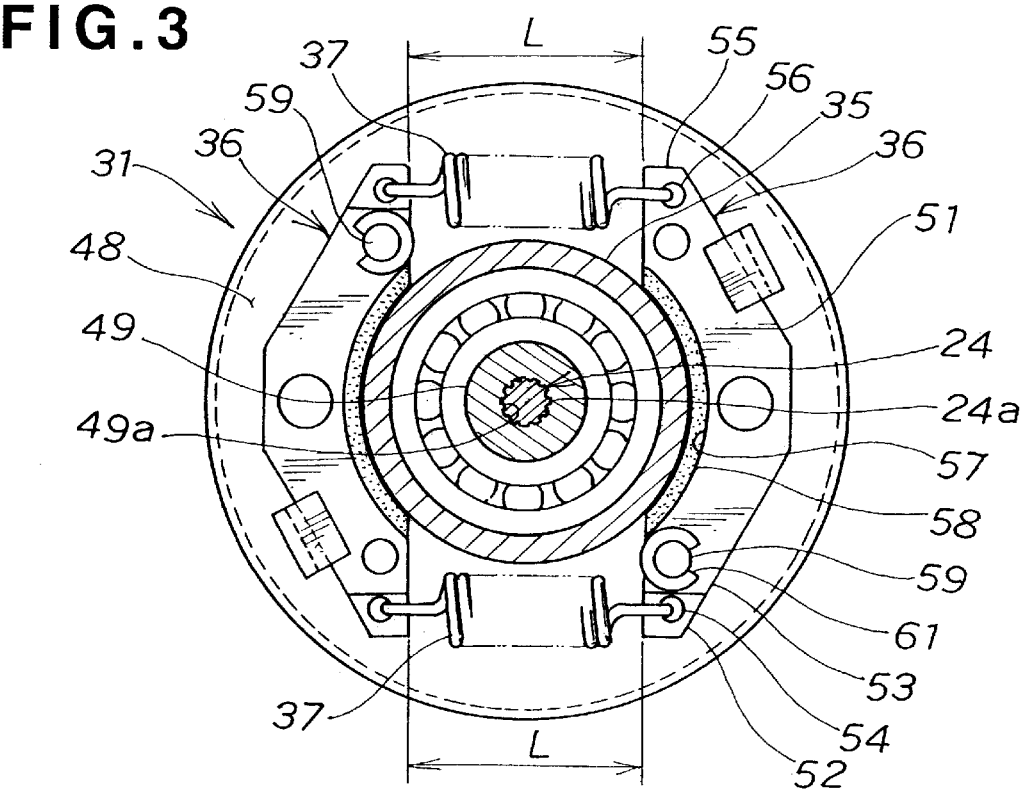
FIG. 3 is a sectional view taken along line 3—3 in FIG. 2.

As shown in FIG. 3, the two braking members 36, 36 are disposed around the brake drum 35 with a distance or interval L left therebetween, while the resilient members 37, 37 are extended between the adjacent braking members 36, 36.

Serration 49a is formed centrally of the connecting shaft 49. Serration 24a is formed on the blade driving shaft 24. The serration 49a is in meshing engagement with the serration 24a.

Each braking member 36 has an arc-shaped body 51. One end 52 of the body 51 is formed with a bearing 53 and a first hooking aperture 54. The other end 55 is formed with a second hooking aperture 56. An engaging portion 57 is formed in the middle, curved to the brake drum 35. A friction member 58 is attached to the engaging portion 57. Spindles 59 are attached to the connecting portion 48 of the clutch drum 31. The bearing 53 is mounted to the spindle 59. Reference numeral 61 denotes a retaining ring.

Figure 4:
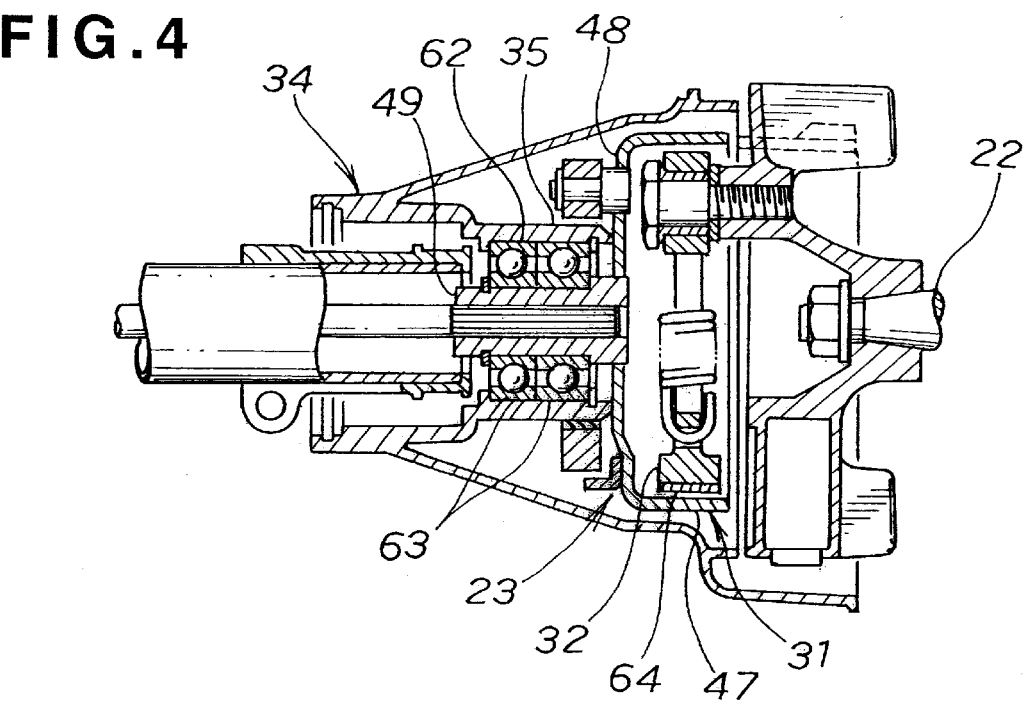
FIG. 4 is a cross-sectional view taken at portion 4 of FIG. 2.

As shown in FIG. 4, the clutch case 34 includes a bearing support 62 provided on the inner surface of the brake drum 35, supporting the connecting shaft 49 via bearings 63, 63.

The member 32 of the centrifugal clutch 23 swings when the number of rotations of the crankshaft 22 exceeds a predetermined value, abutting at one end 64 against the transmitting portion 47, thereby contacting the clutch drum 31.

Now, an operation of the above-mentioned bush cutting machine will be described with reference to FIG. 5A and FIG. 5B.

Figure 5A:
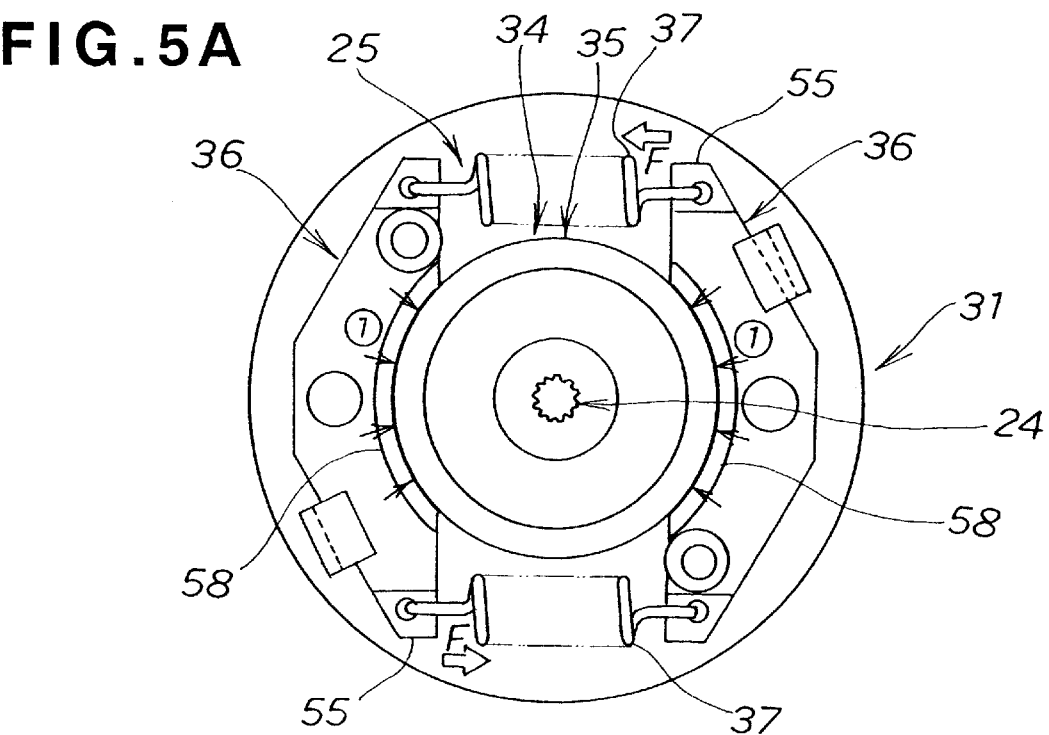
FIGS. 5A and 5B are functional diagrams of the bush cutting machine according to the present invention.

In FIG. 5A, the automatic braking mechanism 25 of the bush cutting machine presses the braking drum 35 with the braking members 36, 36 as shown by arrows ①, ①. This is the state wherein the motor stops. For the cutting operation, the motor is started, increasing the number of its rotations.

Figure 5B:
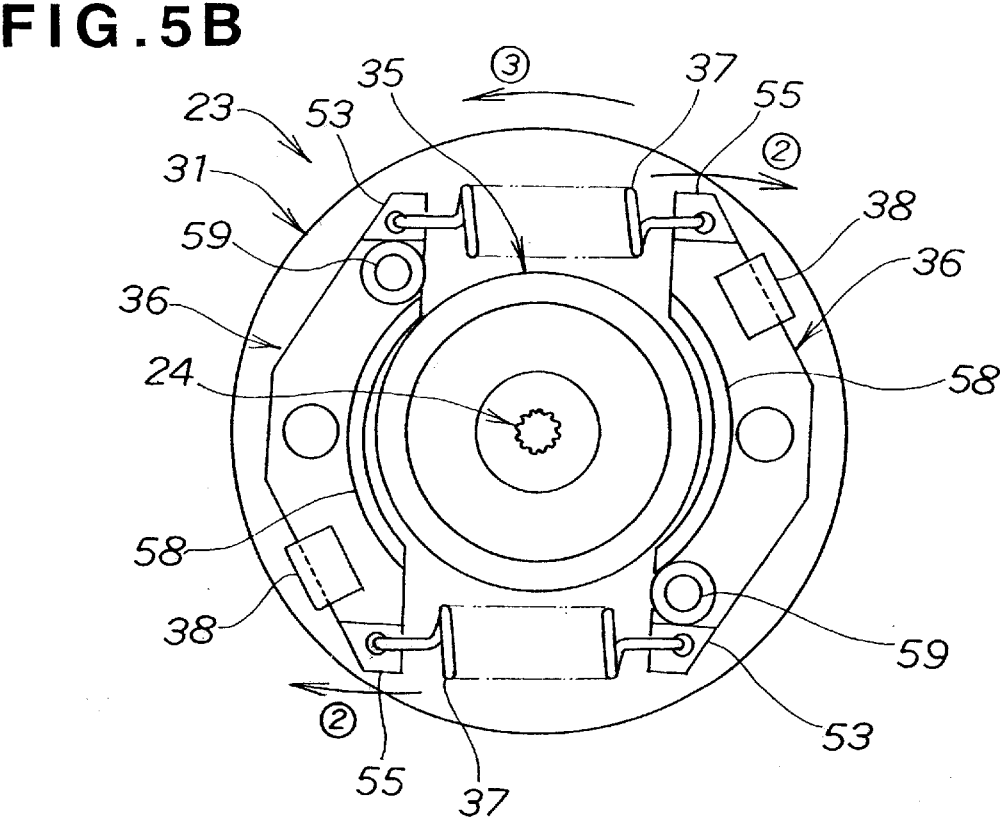

Turning to FIG. 5B, with increase in the number of rotations of the motor, the number of rotations of the clutch drum 31 of the centrifugal clutch 23 increases. Then, the braking members 36, 36 skid over the braking drum 35 with the other ends 55, 55 swung by a centrifugal force about the spindles 59, 59 supporting the bearings 53, 53, in directions shown by arrows ②, ② against the forces of the resilient members 37, 37, thus causing the friction members to move away from brake drum 35. As a result, the number of rotations is further increased, allowing the blade driving shaft 24 to rotate as shown by arrow ③. At this time, the swung braking members 36, 36 abut against stoppers 38, 38, stably maintaining the maximally expanded state.

Conversely, when the number of rotations of the motor is reduced, the other ends 55, 55 are returned to their original positions, as shown in FIG. 5A, by forces F, F of the resilient members 37, 37, and the friction members 58, 58 of the braking members 36, 36 are pressed against the brake drum 35 as shown by arrows ①, ①, thereby causing the clutch drum 31 and hence the blade driving shaft 24 to instantaneously stop rotating.

Since the automatic braking mechanism 25 in which, in correspondence with the reduced number of rotations of the clutch drum 31 of the centrifugal clutch 23, the braking members 36, 36 abut against the brake drum 35, is thus installed in the clutch case 34, manual braking control for stopping rotation of the blade driving shaft 24 is no longer required, thereby improving the driving operability of the machine.

Further, with the automatic braking mechanism 25 installed in the clutch case 34, it is no longer necessary to provide a through hole in the clutch case 34 for allowing passage of such components as a wire and a rod, thus improving dustproof and waterproof properties of the machine.

Still further, with the automatic braking mechanism 25 installed in the clutch case 34, it is no longer necessary to provide such components as a control lever and a wire for a braking operation, thereby reducing the number of components and hence the production cost.

In addition, since the two braking members 36, 36 are disposed around the brake drum 35 in an equidistantly spaced relation to each other and the resilient members 37, 37 are provided to extend between the adjacent braking members 36, 36, it becomes possible to evenly distribute the weight of the components around the rotational center, thereby preventing unbalanced rotation.

Moreover, since the two braking members 36, 36 are provided around the brake drum 35 in an equally spaced relation to each other and the resilient members 37, 37 are provided to extend between the adjacent braking members 36, 36, it becomes possible to render the resulting machine compact and to achieve synchronization of the braking members 36, 36. This leads to reliable braking.

In the embodiment discussed above in relation to FIG. 2, the brake drum 35 is formed in the clutch case 34. Alternatively, the brake drum may be formed at any other fixed portion.

Although two braking members are provided around the brake drum 35, the number of such members may be greater.

What is claimed is:

1. A bush cutting machine comprising:
   a motor;
   a centrifugal clutch designed to establish drive connection when a number of rotations of an output shaft of said motor exceeds a predetermined value;
   a blade driving shaft for transmitting a torque;
   a cutting blade mounted to a distal end of said blade driving shaft;
   said centrifugal clutch comprising a clutch drum provided on said blade driving shaft, a centrifugally pivotal member provided on the output shaft of said motor and housed in said clutch drum, and a clutch case connected to a motor housing for enclosing said pivotal member and said clutch drum; and
   an automatic braking mechanism housed in said clutch case and comprising a brake drum formed integrally within said clutch case, at least two centrifugal braking members pivotally mounted to said clutch drum in such a manner as to expand by a centrifugal force proportionate to the number of rotations of said clutch drum, and resilient members for biasing said braking members to said brake drum, whereby said braking members are brought into abutting engagement with said brake drum with decrease in the number of rotations of said clutch drum.

2. A bush cutting machine as set forth in claim 1, wherein said braking members are disposed around said brake drum in equidistantly spaced relation to each other, and said resilient members are provided to extend between adjacent two of said braking members.

* * * * *